United States Patent
Chafer et al.

(10) Patent No.: US 6,989,821 B2
(45) Date of Patent: Jan. 24, 2006

(54) METHOD OF MANAGING A GRAPHICAL USER INTERFACE

(75) Inventors: Sylvain Chafer, Paris (FR); Omar Marzouki, Paris (FR); Jérôme Mlynarczyk, Neuilly s/Seine (FR); Linda Hélène Hauw, Paris (FR)

(73) Assignee: Alcatel, Paris (FR)

( * ) Notice: Subject to any disclaimer, the term of this patent is extended or adjusted under 35 U.S.C. 154(b) by 226 days.

(21) Appl. No.: 09/855,502

(22) Filed: May 16, 2001

(65) Prior Publication Data

US 2001/0043195 A1    Nov. 22, 2001

(30) Foreign Application Priority Data

May 18, 2000   (FR)   ................................. 00 06356

(51) Int. Cl.
   *G09G 5/00*   (2006.01)
(52) U.S. Cl. ...................... 345/172; 345/168; 345/173; 715/853
(58) Field of Classification Search ................ 345/172, 345/168, 169, 170, 173, 156, 157, 637, 901, 345/905; 715/853, 854, 866; 711/117
   See application file for complete search history.

(56) References Cited

U.S. PATENT DOCUMENTS

| | | | |
|---|---|---|---|
| 4,330,845 A * | 5/1982 | Damerau ..................... | 715/507 |
| 5,208,907 A * | 5/1993 | Shelton et al. ............... | 715/505 |
| 5,794,040 A * | 8/1998 | Ono et al. ................... | 717/100 |
| 5,801,701 A | 9/1998 | Koppolu et al. ............. | 345/821 |
| 6,128,016 A * | 10/2000 | Coelho et al. .............. | 345/808 |
| 6,247,020 B1 * | 6/2001 | Minard ..................... | 707/104.1 |
| 6,249,284 B1 * | 6/2001 | Bogdan ...................... | 345/764 |
| 6,256,030 B1 * | 7/2001 | Berry et al. ................ | 345/854 |
| 6,272,537 B1 * | 8/2001 | Kekic et al. ................ | 709/223 |
| 6,307,548 B1 * | 10/2001 | Flinchem et al. ........... | 345/811 |
| 6,329,984 B1 * | 12/2001 | Boss et al. .................. | 345/723 |
| 6,396,522 B1 * | 5/2002 | Vu ............................. | 345/848 |
| 6,415,298 B1 * | 7/2002 | Oesterer et al. ............ | 707/203 |
| 6,559,871 B1 * | 5/2003 | Brozowski et al. ......... | 345/853 |
| 6,633,313 B1 * | 10/2003 | Cirne et al. ................. | 345/744 |

FOREIGN PATENT DOCUMENTS

| | | |
|---|---|---|
| EP | 0 762 263 A2 | 3/1997 |
| EP | 0 844 555 A2 | 5/1998 |

* cited by examiner

*Primary Examiner*—Xiao Wu
*Assistant Examiner*—Abbas Abdulselam
(74) *Attorney, Agent, or Firm*—Sughrue Mion, PLLC

(57) ABSTRACT

A method of managing keyboard events for a graphical user interface configured in the form of a tree of graphical elements. Each graphical element of the tree is associated with a list of keys, and each listed key is associated with an action to be initiated on receipt of a keyboard event corresponding to the key and the graphical element.

13 Claims, 4 Drawing Sheets

FIG_1a
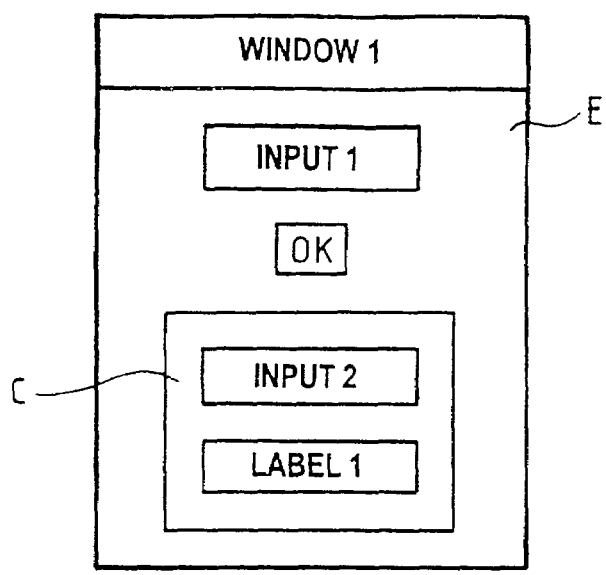
FIG_1b
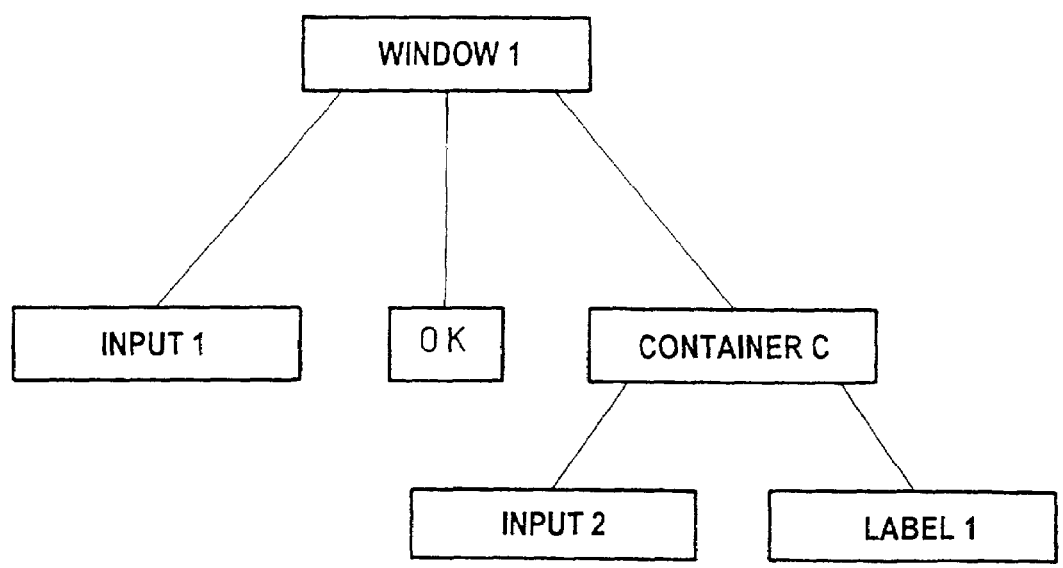

FIG_2a
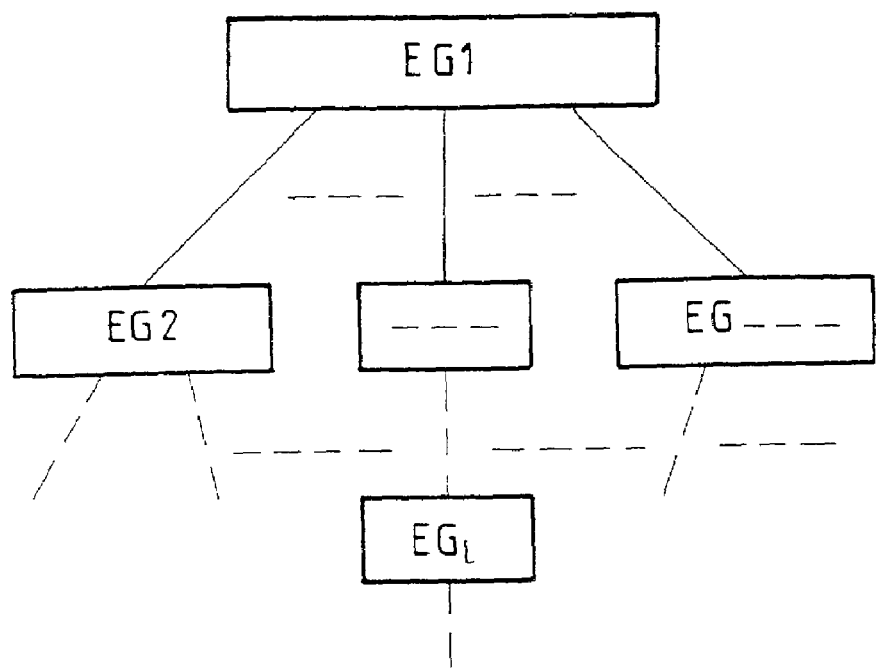
FIG_2b
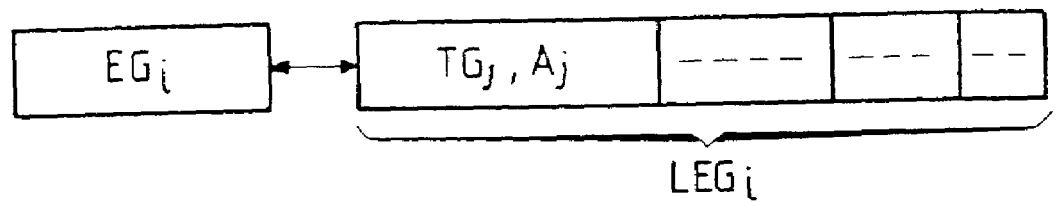

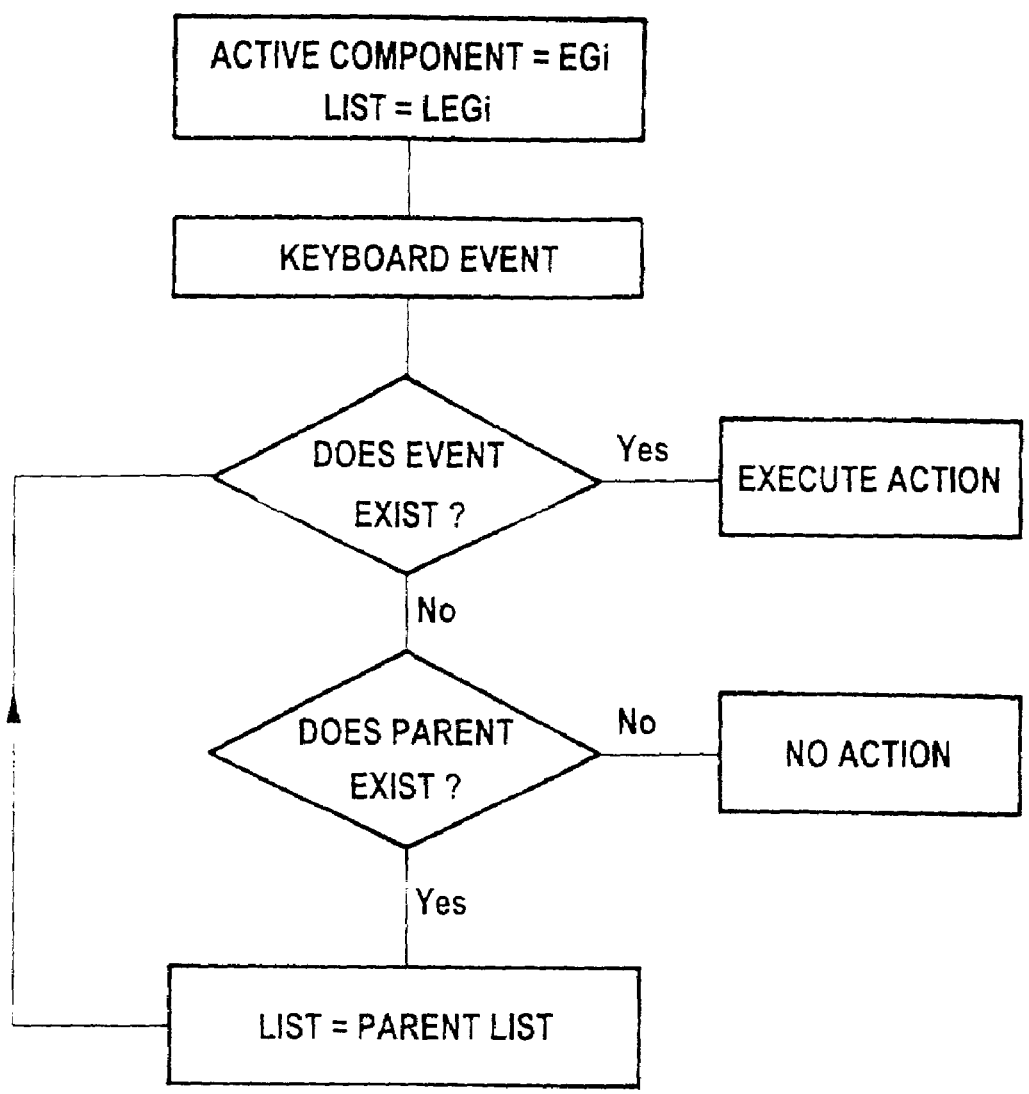
FIG_3

FIG_4
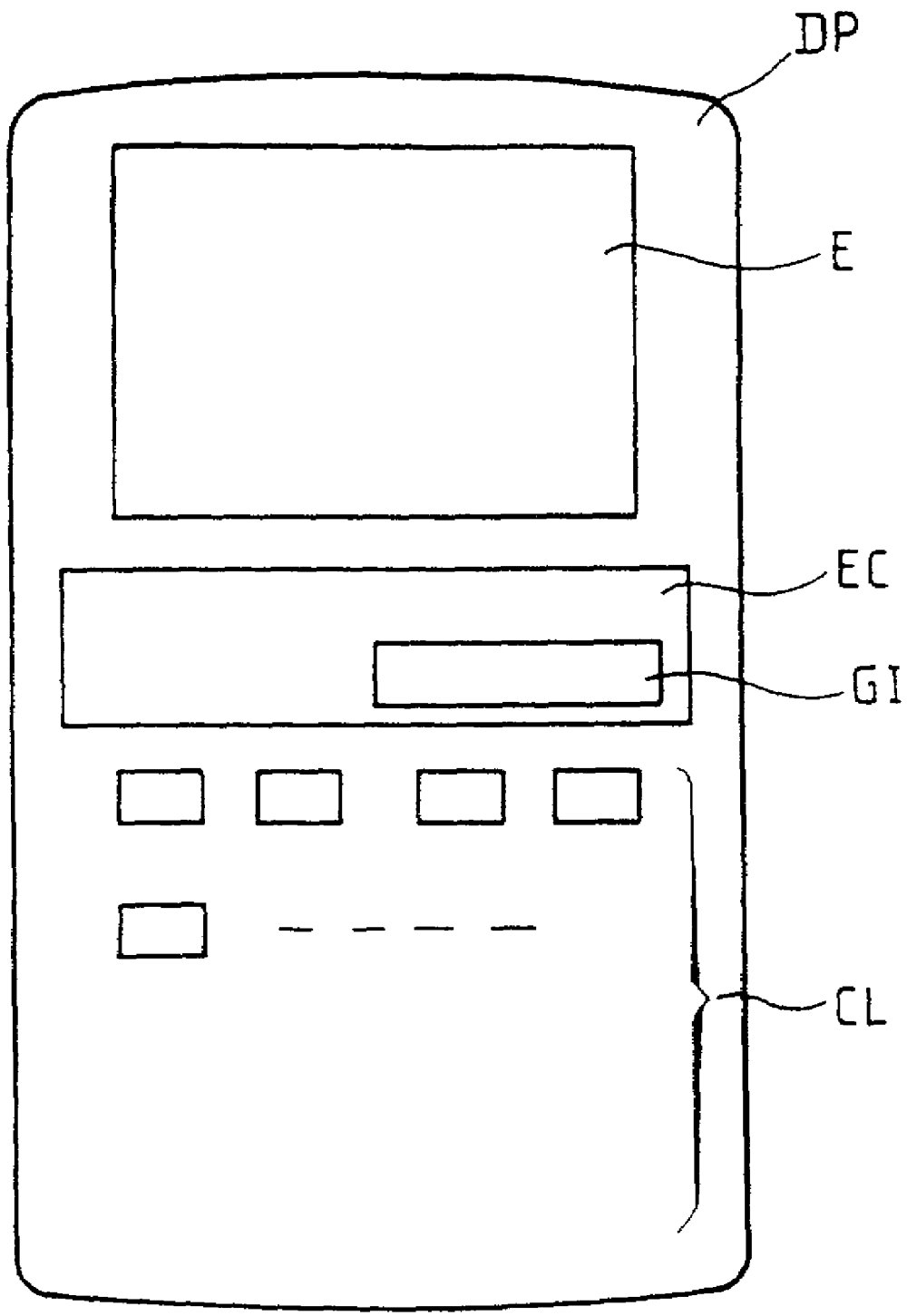

METHOD OF MANAGING A GRAPHICAL USER INTERFACE

The invention relates to a method of managing keyboard events of a graphical user interface configured in the form of a tree of graphical elements.

The invention also relates to a system including this kind of interface.

The field of the invention is that of navigating the graphical interface of a system which has a keyboard but no pointing tool or mouse, such as a mobile telephone or a pocket organizer.

BACKGROUND OF THE INVENTION

Graphical applications executed on this type of system can be developed in various programming languages and in particular in an object-oriented programming language such as Java.

In object-oriented programming, classes are defined which each have their own characteristics. The classes are related by parent-child relationships, the child class inheriting characteristics from the class of its parent.

Most graphical applications developed in the Java environment define classes representing graphical elements or components that can be nested. Examples of graphical components are: windows, input fields, "OK" buttons, labels, etc. The programmer can also define new components.

FIG. 1a) shows one example of a screen E composed in this way. The screen E includes simple graphical components such as input fields, labels, and buttons. It also includes a component (container) C that is complex, i.e. one in which components are nested. A window-type graphical component "Window 1" has been chosen first. Three components are nested in the "Window 1" component: an input field "Input 1", an "OK" button and a container C in which are nested an input field "Input 2" and a label "Label 1".

FIG. 1b) shows a tree of graphical components which corresponds to the above composition. The parent graphical component "WINDOW 1" has three child graphical components "INPUT 1", "OK" and a container C, the last of which itself has two child components "INPUT 2" and "LABEL 1".

It is useful for the user of this kind of system to be provided with keyboard shortcuts. A keyboard shortcut consists of a key which, when pressed, or a combination of keys which, when pressed simultaneously, initiate a specific action regardless of the graphical component on which it is located. For example, the keyboard shortcut "Ctrl Z" entails pressing the "Ctrl" key and the "Z" key simultaneously. Thus in this example the user may require a keyboard shortcut to initiate the action "Go back to the previous screen" when the component that is active, i.e. awaiting a keyboard event, is the "INPUT 2" component. The user would also wish to have access to the same keyboard shortcut, initiating the same action, if the active component were the "OK" button.

However, the navigation processes of graphical applications developed in Java do not provide for the use of keyboard shortcuts.

OBJECT AND SUMMARY OF THE INVENTION

The object of the invention is to circumvent this limitation for applications executing on systems with no mouse by enabling developers of such applications to define keyboard shortcuts.

The invention provides a method of managing keyboard events for navigating a graphical user interface configured in the form of a tree of graphical elements $EG_i$, wherein each graphical element $EG_i$ of the tree is associated with a list $LEG_i$ of keys $TG_j$ and wherein each key $TG_j$ listed in said lists is associated with an action $A_j$ to be initiated on receipt of a keyboard event corresponding to said key and said graphical element.

If a graphical element $EG_i$ is active and a keyboard event is detected by the interface, the method includes the following steps:

comparing said keyboard event to the keys $TG_j$ listed in said lists $LEG_i$, starting with the list for the active component $EG_i$ and working back up said tree, and initiating the action associated with the first key corresponding to said keyboard event.

The invention also relates to a portable system DP having a graphical interface including a keyboard CL, a screen E and an interface management unit GI, wherein the management unit employs a method of managing keyboard events as previously described.

The system DP can be a mobile telephone or a pocket organizer.

BRIEF DESCRIPTION OF THE DRAWINGS

Other features and advantages of the invention will become clearly apparent on reading the description given by way of non-limiting example and with reference to the accompanying drawings, in which:

FIG. 1a) shows one example of a screen made up of graphical elements in accordance with the prior art, FIG. 1b) shows a tree structure associated with the above example, FIG. 2a) shows a tree of graphical elements in accordance with the invention, FIG. 2b) shows in more detail a graphical element which is associated in accordance with the invention with a list of keyboard shortcut pairs and the corresponding actions, FIG. 3 is a flowchart showing how the invention works, and FIG. 4 shows a portable system employing a keyboard event management method according to the invention.

MORE DETAILED DESCRIPTION

FIG. 2a) shows a tree of graphical elements in accordance with the invention in which each graphical element $EG_i$, where i varies in the range from 1 to the number N of graphical elements used to compose a screen, is associated with a list $LEG_i$ of pairs, shown in FIG. 2b), each of which pairs comprises a keyboard shortcut $TG_j$ and an associated action $A_j$ to be executed, where j varies in the range from 1 to the number M of pairs defined in the tree.

In the mode of operation shown in FIG. 3, i.e. if a keyboard event occurs when the component $EG_i$ is active, the keyboard event is compared to each keyboard shortcut $TG_j$ in the list $LEG_i$ for the active component $EG_i$. If the event is not in that list, the comparison is repeated but this time using the list for the component preceding the active component in the tree, i.e. the parent component. The process therefore works back up the tree in this way until it finds the keyboard shortcut $TG_j$ corresponding to the keyboard event. The action associated with the keyboard shortcut $TG_j$ is then initiated.

Because of this path through the tree, it is not essential to define a pair $(TG_j, A_i)$ in the list for a component for that pair to be associated with that component: it is sufficient for it to be defined in the list of one of the "parent" components. Thus a list $LEG_i$ can be empty. If, after following the path through the tree, no keyboard shortcut corresponding to the keyboard event is found, then no action is initiated; an error can be indicated to the user.

This global definition of the pairs $(TG_j, A_i)$ has a number of advantages. If new components $EG_i$, or even new containers, are introduced into the tree subsequently, they automatically inherit the pairs $(TG_j, A_i)$ from their parents, without it being necessary to associate them with the latter in their list $LEG_i$. This shortens the lists commensurately.

This mode of operation based on a path through the tree offers great flexibility. It may be required in connection with a component $EG_i$ to change a pair in the list $LEG_l$, for example the action $A_k$ associated with an existing global shortcut $TG_k$. It is sufficient to define in the list $LEG_l$ a new pair associating a new action $A_k$, with the keyboard shortcut $TG_k$.

As shown in FIG. 4, a system DP employing this kind of graphical interface conventionally includes a keyboard CL, a screen E and a user interface control unit GI included in control electronics EC. The developer responsible for management of the interface integrates the proposed solution into the management unit GI.

What is claimed is:

1. A method of managing keyboard events for a graphical user interface configured in the form of a tree of graphical elements, said tree comprising parent graphical elements and child graphical elements, wherein each graphical element of the tree is associated with a key list and each key listed in said key lists is associated with an action to be initiated on receipt of a keyboard event corresponding to said key and said graphical element, wherein when one graphical element is active and a keyboard event is detected by an interface, the method comprises:
    comparing said keyboard event to the keys listed in said key lists, starting with the key list associated with the active graphical element and traversing said tree of parent graphical elements and child graphical elements towards its root if said keyboard event was not found in said key list associated with the active graphical element, and
    initiating the action associated with the first key found that corresponds corresponding to said keyboard event.

2. A portable system having a graphical interface comprising a keyboard, a screen and an interface management unit, wherein the management unit employs a method of managing keyboard events according to claim 1.

3. The system according to claim 2, wherein the system is a mobile telephone.

4. The system according to claim 2, wherein the system is a pocket organizer.

5. The method according to claim 1, wherein an error message is generated if said keyboard event is not matched to one of the keys listed in said key lists.

6. A method of managing keyboard events for a graphical user interface comprised of hierarchically related graphical elements, said hierarchically related graphical elements comprising parent graphical elements and child graphical elements, the method comprises:
    associating each graphical element with a key list, wherein each key list stores a plurality of keys;
    associating at least one key listed in each of said key lists with an action; and
    when one graphical element is active and a keyboard event is detected by an interface, the method further comprises:
        comparing said keyboard event to the keys listed in said key lists, starting with the key list associated with the active graphical element and traversing said hierarchically related graphical elements towards said parent graphical elements if said keyboard event was not found in said key list associated with the active graphical element, and
        initiating the action associated with the first key found that corresponds to said keyboard event.

7. A portable system having a graphical interface comprising a keyboard, a screen and an interface management unit, wherein the management unit employs a method of managing keyboard events according to claim 6.

8. The system according to claim 7, wherein the system is a mobile telephone.

9. The system according to claim 7, wherein the system is a pocket organizer.

10. The method according to claim 6, wherein an error message is generated if said keyboard event is not matched to one of the keys listed in said key lists.

11. A graphical user interface comprised of hierarchically related graphical elements, said hierarchically related graphical elements comprising parent graphical elements and child graphical elements, the graphical user interface comprising:
    a key list associated with each graphical element, wherein each key list stores a plurality of keys;
    a plurality of actions, with each action being associated with at least one key listed in each of said key lists, such that when a keyboard event is received when there is an active graphical element, the graphical user interface compares said keyboard event to the keys listed in said key lists, starting with the key list associated with the active graphical element and traversing said hierarchically related graphical elements towards said parent graphical elements if said keyboard event was not found in said key list associated with the active graphical element, and initiates the action corresponding to the first key found that corresponds to the said keyboard event.

12. The graphical user interface as claimed in claim 11, wherein, after receipt of a keyboard event, if the active graphical element is a child graphical element, the key list of the child graphical element is searched before the key list of its parent graphical element is searched.

13. The graphical user interface according to claim 12, wherein an error message is generated if said keyboard event is not matched to one of the keys listed in said key lists.

* * * * *